(No Model.)

H. C. SPALDING.
SUBTERRANEAN ELECTRIC CABLE.

No. 327,483. Patented Sept. 29, 1885.

WITNESSES
Alex. L. Hayes
Sanford H. Dudley

INVENTOR
Henry C. Spalding

UNITED STATES PATENT OFFICE.

HENRY C. SPALDING, OF BOSTON, MASSACHUSETTS.

SUBTERRANEAN ELECTRIC CABLE.

SPECIFICATION forming part of Letters Patent No. 327,463, dated September 29, 1885.

Application filed December 21, 1883. Renewed February 28, 1885. (No model.)

*To all whom it may concern:*

Be it known that I, HENRY C. SPALDING, a citizen of the United States, residing at Boston, in the county of Suffolk and State of Massachusetts, have invented certain new and useful Improvements in Subterranean Electric Cables, of which the following is a specification, reference being had to the drawings accompanying and forming a part of the same.

My invention relates to systems of underground conductors; and its objects are to reduce the expense and facilitate the laying of the same, and to produce a system of conductors that shall be free from electrical inductive disturbances and perfectly insulated. These objects I attain by constructing a cable without armor and finished only so far as will give it the requisite strength and compactness to be reeled and transported. This I support by means of sectional blocks in a trough or conduit, and pour into the same an insulating material which surrounds the cable.

The wires of the cable are separately insulated and inclosed in an insulated metallic sheath, so that not only are a large number brought into a comparatively small space, but a great saving of the metal used for shutting off induction effected.

The nature and objects of my invention will be more fully understood by reference to the accompanying drawings.

Figure 1:
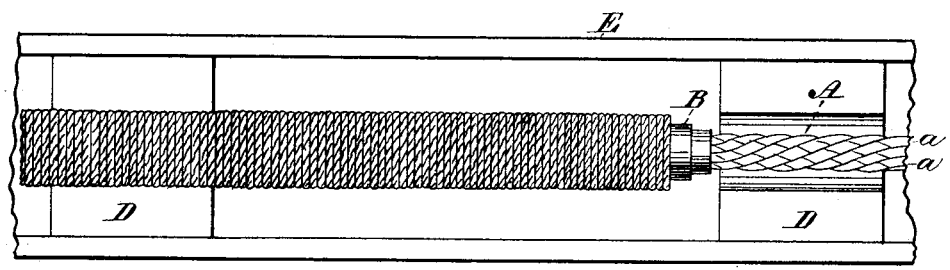
Figure 2:
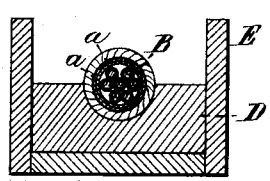
Figure 3:
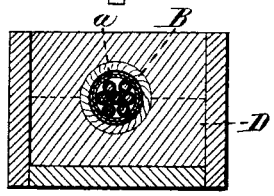
Figure 4:
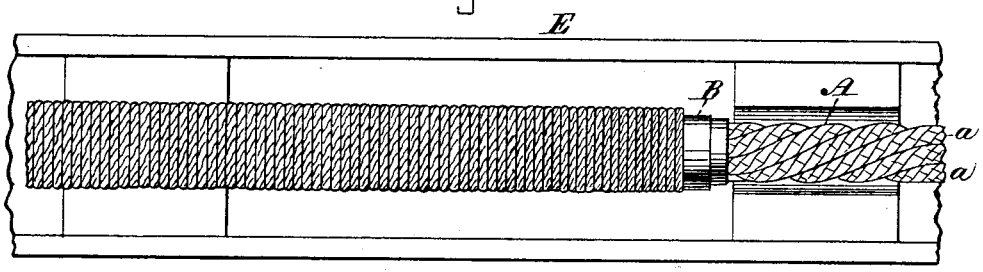
Figure 5:
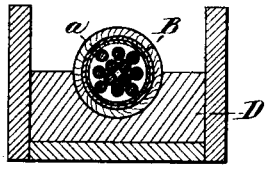
Figure 6:
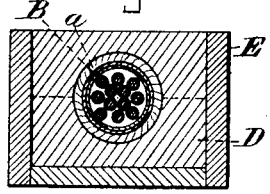

Figure 1 is a plan view of a conduit and cable contained therein. Fig. 2 is a cross-section of the conduit showing an insulating-rest. Fig. 3 is a cross-section of the conduit when filled with an insulating compound. Fig. 4 is a plan view of a modified form of cable. Figs. 5 and 6 are sectional views of the cable and the conduit corresponding to Figs. 2 and 3.

Similar letters indicate corresponding parts in all the figures.

The cable contains a given number of insulated wires, *a a*, which I prefer to insulate from each other by first coating them with a resinous varnish and then wrapping around them paraffined paper. These wires may be twisted or braided together singly, as shown in Fig. 1, or they may be twisted together to form strands, and these twisted or braided to form the core, as shown in Fig. 4. In either case I prefer to use the wires for the leading and return portions of circuits. Around the core I apply a coating of bituminous compound, F, to form a round and even surface, upon which I then wind a layer of metal foil and then a layer of paper, first applying to the metal foil a coating of varnish. This completes the insulation of the conductors and prevents induction and retardation. The insulating covering, consisting of the layers of metal and paper and designated by the letter B, may be, and preferably is, of the kind described in an application filed by me November 30, 1883. Around the covering B, I then wind directly, or as described in other applications filed by me, noticeably that of December 7, 1883, a serving of twine, that renders the cable compact and capable of being handled, reeled, and transported.

E designates the conduit. It may be an ordinary trough composed of boxes of given length that are placed in the ground as the cable is laid. In them I place at short intervals insulating-rests D, for which I prefer blocks of hard bituminous material, such as those described in an application filed by me December 7, 1881. Upon these the cable is laid. Other blocks similar in shape are then placed over the cable to hold it in position in the conduit and the spaces in the box or trough filled in with an insulating compound similar to that composing the blocks D, but preferably containing in its composition some material to prevent it from hardening.

The specific construction of the cable or conduit, or the materials used in both, is obviously a matter largely of choice.

Without restricting myself, therefore, to the details herein set forth, what I claim as my invention is—

1. The combination of a flexible cable containing a number of insulated wires surrounded by layers of insulating material, a sectional conduit or trough, and insulating blocks or rests for supporting the cable in the conduit, as herein set forth.

2. The combination of a flexible cable containing a number of insulated wires surrounded by layers of insulating material, a sectional conduit or trough, insulating blocks or rests for supporting the cable in the conduit, and a filling of insulating material, as herein described.

3. The combination of a flexible cable containing a number of insulated wires surrounded by layers of insulating material and a metal screen or sheath, a sectional conduit, means for supporting the cable in the conduit, and a filling of insulating material.

In witness whereof I have hereunto signed my name in the presence of two subscribing witnesses.

HENRY C. SPALDING.

Witnesses:
 ALEX. L. HAYES,
 E. B. WELCH.